INVENTOR.
Thomas A. Harris
BY
Hugh L. Fisher
ATTORNEY

United States Patent Office 3,379,983
Patented Apr. 23, 1968

3,379,983
PEAK READING VOLTMETER
Thomas Albert Harris, Brighton, Mich., assignor to General Motors Corporation, Detroit, Mich., a corporation of Delaware
Filed Dec. 24, 1964, Ser. No. 420,888
10 Claims. (Cl. 328—151)

ABSTRACT OF THE DISCLOSURE

A peak-to-peak amplitude meter for a time-varying voltage. First and second integrators track and store voltage during positive going and negative going portions, respectively. Gated transfer to storage and combining means is controlled by voltage comparators which sense the positive and negative peak conditions.

Summary of the invention

Figure 1:
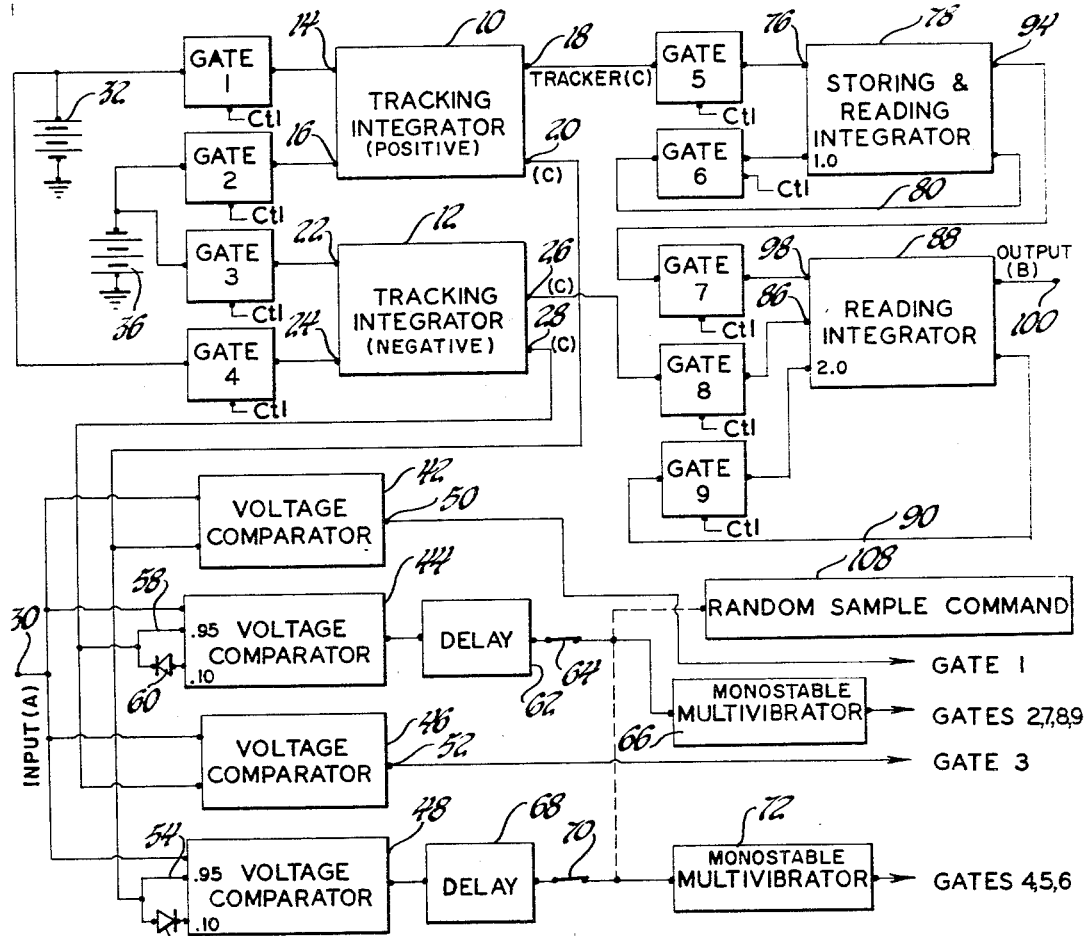

This invention relates to apparatus for measuring the peak-to-peak amplitude variations of a time-varying signal quantity, such as a voltage waveform, and more particularly to meters of the type wherein peak-to-peak input signal amplitude information is obtained through generation of a first signal representing the peak value of the positive going portion of the input waveform, independent generation of a second signal representing the peak value of the negative going portion of the waveform and final combination of the first and second signals to compute the peak-to-peak amplitude excursion.

In accordance with the invention it is possible to measure the peak-to-peak amplitude variation in a time-varying input quantity, such as a voltage waveform, with comparatively great latitude in the input signal characteristics, such as frequency, wave shape, amplitude and DC level which are acceptable to the measuring apparatus. In general, this is accomplished by a combination which includes a first input means which is responsive to the positive going portion of the input quantity to produce a first signal which follows the input quantity toward a positive peak value and which remains at this peak value until further command. The combination includes a second input means responsive to the negative going portions of the input quantity to produce a second voltage which increases toward a negative peak in the input quantity and which thus remains at this peak value. For calculating the desired peak-to-peak amplitude information, summing means are provided for combining the outputs of the first and second input means when, under control of periodically operating information transfer means, the information from the first and second input means is transferred to the summing means for computation.

In accordance with the invention, the transfer of information from the input means may be accomplished either randomly with respect to the frequency of the input waveform, or in a direct relation to the frequency of the input waveform; for example, after each complete cycle thereof. According to the latter described alternative, first and second input means are provided for responding to the positive and negative going portions of the input signal quantity respectively to produce first and second signals which increase correspondingly toward positive and negative peaks, respectively. In addition, storage means are provided for storing electronically the peak value generated in the first input means. The information from the first input means is transferred to the storage means by a first transfer means which is responsive to a first predetermined increment in the negative going portion of the input signal quantity, which increment signals the fact that a positive peak has been reached. A second transfer means responsive to a first increment of a positive going portion of the input signal quantity, which increment signals the occurrence of a negative peak, transfers the positive peak information from the storage means and the negative peak information from the second input means to a summing means which is effective to combine the received information and provide an output which is related to the peak-to-peak value of the input signal quantity.

Figure 2:
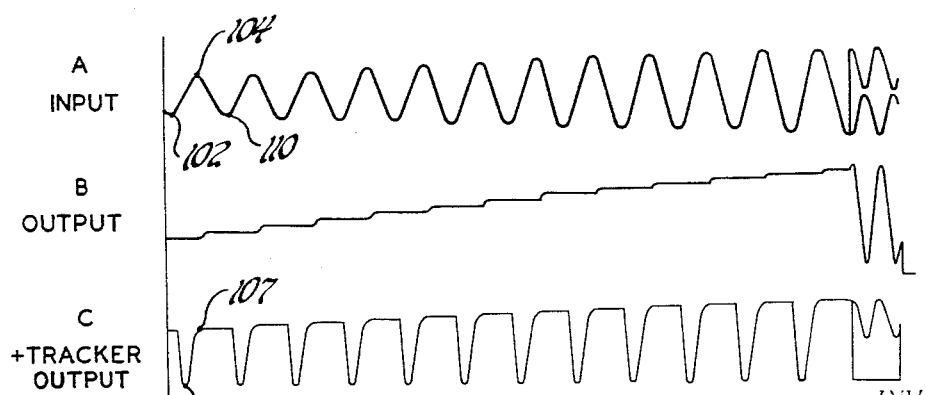

Since the invention as broadly defined above may be best understood from a reading of a detailed description of a specific embodiment, such a description is given in the following specification which is to be taken with the accompanying drawings of which:

FIGURE 1 is a simplified schematic diagram of the specific embodiment of the invention; and FIGURE 2 is a representative portion of the input, output and peak value information waveforms used in describing the operation of the specific embodiment shown in FIGURE 1.

FIGURE 1 shows a peak-to-peak voltage amplitude meter which is effective to provide an output voltage related in amplitude to one-half of the peak-to-peak voltage of an input voltage waveform substantially independently of the frequency or DC level of the input voltage waveform. Briefly, this is carried out through the provision of a first closed loop tracking means which receives the input waveform and which effectively tracks the waveform to provide a first voltage which corresponds to the positive going portion of the input waveform. Upon reaching a positive peak, the peak value information from the first tracking means is transferred by a comparator-controlled gate device to a storage means such as a unity gain operational amplifier. A second tracking means is also connected to receive the input waveform and to produce a second signal voltage which corresponds to the negative going portion of the input waveform. By means of a second comparator-controlled gating device, or a plurality of such devices, negative peak information from the second tracking means, as well as the positive peak information from the storage means, are transferred to a summing device which combines the information at a gain factor of two to produce an output reading which is related to one-half of the peak-to-peak voltage of the input waveform. Under certain circumstances the transfer of information throughout the system as briefly described above is accomplished during each cycle of the input waveform. However, under certain other circumstances it may be desirable to periodically perform the information transfer from the tracking means to the summing device without regard to the periodicity of the input signal waveform. The embodiment of the invention shown in FIGURE 1 is equipped to operate in either of these modes.

Referring more specifically to FIGURE 1, the peak-to-peak voltmeter comprises a pair of integrators 10 and 12 which are basic elements in respective closed-loop systems for tracking the positive going and negative going portions of an input voltage applied to input terminal 30 and having a waveform such as that shown on Line A of FIGURE 2. Integrator 10 has a track input 14 and a reset input 16 and a pair of outputs 18 and 20. Similarly, integrator 12 has a track input 22, a reset input 24 and a pair of outputs 26 and 28. The track input 14 of integrator 10 is connected through a controlled gate No. 1 to the positive terminal of a DC voltage source 32. The reset input 16 of integrators 10 is connected through a controlled gate No. 2 to the negative terminal of a second voltage source 36. In a reverse manner, the track input 22 of integrator 12 is connected through a controlled gate No. 3 to the negative terminal of source 36, while the reset input 24 is connected through a controlled gate No. 4 to the positive terminal of source 32. Each of the gates 1–4 is responsive to a signal received at the control terminal thereof (marked C) to complete the circuit through the gate.

An input voltage waveform, such as that shown on Line A of FIGURE 2, may be applied to the system via an input terminal 30 which is commonly connected to the first input of each of a plurality of voltage comparators 42, 44, 46 and 48. Each of the comparators is effective to compare at least two voltages and to provide an output of one character when the sum of the voltages equals or exceeds a predetermined value and to provide an output of a second character when the sum of the voltages is less than a predetermined value. In connection with the aforementioned closed-loop tracking systems, output 20 of tracking integrator 10 is connected to the second input of comparator 42 and the output 28 of integrator 12 is connected to the second input of comparator 46. Output 50 of comparator 42 is connected to the control terminal of gate No. 1 as indicated by legend in FIGURE 1. Similarly, output 52 of comparator 46 is connected to the control terminal of gate No. 3 as indicated.

Briefly describing the operation of the circuit as thus far explained, application of a positive going voltage to input terminal 30 causes comparator 42 to produce an output at 50 which closes a circuit through gate No. 1. This applies the voltage from source 32 to input 14 of integrator 10 and the integrator 10 generates a negative output which increases linearly according to the time integral of the input voltage at 14. This output, taken from point 20, is conveyed to the second input of comparator 42 where it is effectively compared with the input waveform at 30. Thus there is formed a closed-loop tracking system which opens and closes gate No. 1 in such a manner that the integrator output follows or tracks the positive going portion of the input signal at 30. Similarly, a negative going input voltage at terminal 30 produces an output from comparator 46 which opens gate No. 3 such that the integrator 12 produces a positive output voltage at 28 which increases linearly with the time integral of the voltage at 22. This output voltage is then compared at the second input of comparator 46 to control gate No. 3 in such a manner that the signal generated in integrator 12 follows or tracks the negatively increasing amplitude of the input at terminal 30.

Output 20 of integrator 10, in addition to being connected to the second input of comparator 42 is also connected through line 54 to an input of comparator 48 having a gain factor of 0.95. Output 20 is further connected through a positive conducting diode 56 to an input of comparator 48 having a gain factor of 0.10. The combined effect of circuits 54 and 56 is to produce an overall gain factor of 1.05 to the second input of comparator 48 for positive outputs from integrator 10 and an overall gain factor of 0.95 for negative outputs. Similarly, output 28 of integrator 12 is also connected through a line 58 to 0.95 gain factor input of comparator 44 and through reverse conducting diode 60 to a 0.10 gain factor input of comparator 44. Due to the connection of diode 60, negative voltages have an overall gain factor of 1.05 from integrator 12 to the second input of comparator 44 while positive voltages have only a 0.95 factor.

The output of comparator 44 is connected through a delay circuit 62 and a switch 64 to the input of a one-shot multivibrator 66. The output of the multivibrator 66 is connected, among other places to be described, to the control terminal of gate No. 2 such that an output pulse from the multivibrator 66 is effective to momentarily connect the negative voltage of source 36 to the reset input 16 of integrator 10, thereby to reset the integrator. The output of the comparator 48 is similarly connected through a delay circuit 68 and a switch 70 to one-shot multivibrator 72. Multivibrator 72 is connected, among other places to be described, to the control terminal of gate No. 4, such that upon a pulse from multivibrator 72, gate No. 4 momentarily connects the positive terminal of source 32 to the reset input 24 of integrator 12.

To complete the computation process of the peak-to-peak value, the output 18 of integrator 10 is connected through a controlled gate No. 5 to the information input 76 of a reading integrator 78 which froms a basic part of a storing and reading means for information from the tracking integrator 10. A unity gain factor for integrator 10 is set by a circuit 80 which is under the control of a gate No. 6. Similarly, the output 26 of tracking integrator 12 is connected through a gate No. 8 to a first information input 86 of a second reading integrator 88. In addition, output 94 of integrator 78 is connected through a gate No. 7 to a second information input 98 of integrator 88. This integrator 88 serves as a calculating device or summing means to sum the amplitude of the voltages appearing at inputs 86 and 98 and to produce an output voltage on terminal 100 which corresponds to one-half of the sum of these voltages. The one-half factor is determined by a circuit 90 through a gate No. 9 which has a gain factor of 2.

It can be seen that gates No. 5 and No. 6, which control the transfer of information from tracking integrator 10 to storing and reading integrator 78 are under the control of voltage comparator 48 through the one-shot multivibrator 72. Further, it may be seen that gates No. 7, No. 8, and No. 9 are under the control of voltage comparator 44 through the one-shot multivibrator 66. According to this scheme, multivibrator 72 effects a transfer of the positive peak information from integrator 10 to integrator 78 where it is stored. Multivibrator 66 effects transfer of both positive and negative peak information to integrator 88 where the summation step is performed.

Describing the operation of the circuit as thus far presented, reference will be had to waveforms A, B and C of FIGURE 2. Considering the portion of input waveform A between points 102 and 104, assuming this positive going voltage is applied to input 30, integrator 10, under the control of comparator 42, will, as previously described, produce an output voltage at 18 and 20 which follows or tracks the increasing amplitude of the input waveform. This is shown between points 106 and 107 of tracker output waveform C of FIGURE 2. Upon reaching the positive peak 104 of the input voltage, the output 20 from integrator 10 equals the input waveform amplitude, thus cutting off the output from comparator 42, disabling gate No. 1, thereby disconnecting source 32 from the tracking point 14 of integrator 10. At this point, integrator 10 maintains an output voltage at 18 and 20 corresponding to the inverse of the positive peak amplitude of the input waveform at 30. After the input waveform passes the positive peak point 104 and decreases in amplitude approximately 5% such that the .95 gain input from tracking integrator 12 of comparator 48 exceeds the the 1.0 gain input from 30 for the first time, comparator 48 produces an output which, after a slight delay occasioned by delay circuit 68, actuates the one-shot multivibrator 72 to produe a pulse output. This pulse output is applied to gates No. 5 and No. 6 which permit transfer of the positive peak voltage information from integrator 10 to storing integrator 78. At the same time, the output from the multivibrator 72 enables gate No. 4, which resets integrator 12 in preparation for a tracking of the negative going portion of the input waveform A. During this negative going portion of the waveform between points 104 and the negative peak 110, tracking integrator 12 functions to track the input voltage in the same manner as tracking integrator 10 tracks the positive going portion of the waveform. During this negative tracking step comparator 46 produces an output on 52 which enables gate No. 3 to apply the negative voltage of source 36 to the tracking input 22 which is integrated by integrator 12. Upon reaching the negative peak 110, comparator 46 shuts off, closing gate No. 3 to maintain accurately the negative peak information. After the waveform has passed the negative peak 110 and has increased approximately 5% such that the .95 gain input of comparator 44 from integrator 12 exceeds the input 30 for the first time during the negative tracking step, comparator 44 produces an output which, after a short delay occasioned by delay circuit 62, operates multivibrator 66 to produce a pulse output. This pulse is applied to gates No. 7, No. 8 and No. 9 to enable these gates, thus permitting transfer of the positive peak information from output 94 of integrator 78 to input 98 of integrator 88, transfer of the negative peak information from output 26 to input 86 of integrator 88, and permitting the summation step in integrator 88. The integrator 88 produces an output at 100 which corresponds to one-half of the sum of the two inputs at 86 and 98. This sum is, thus, equal to one-half of the peak-to-peak value of the input waveform A measured between points 102 and 110 and is shown on line B of FIGURE 2. The output of multivibrator 66 also enables gate No. 2 to reset the positive tracking integrator 10 in preparation for a tracking of the following positive going portion of the input waveform.

As will be apparent to those skilled in the art, the integrators 10 and 12 have inherent output voltage rise rates. In the event the frequency of the input waveform applied to terminal 30 is such that the response of the tracking integrator 10 and 12 does not permit them to reach the input waveform peaks during the respective first half-cycles of operation, it is desirable to perform the information transfer operation after a number of cycles of the input waveform have occurred. This insures that the tracking integrators 10 and 12 have, in fact, reached peaks prior to the transfer step. This may be performed by means of the random sample command circuit 108, which, as shown, is connected to the input of each of the one-shot multivibrators 66 and 72. The random sample command circuit 108 may be, for example, a variable frequency multivibrator, one end of which is commonly connected to the two one-shot multivibrators 66 and 72.

In operation of the random sample command, the comparators 44 and 48 are effectively disconnected from the circuit operation by opening switches 64 and 70. This may be manually accomplished. No change in the circuits between comparators 42 and 46 and gates No. 1 and No. 3 is made. Thus, gates No. 1 and No. 3 are controlled by the comparators 42 and 44 during the tracking operation as was previously the case. However, the transfer gates No. 5, No. 6, No. 7, No. 8 and No. 9 are now enabled by simultaneously outputs of the one-shot multivibrators 66 and 72. This transfer operation occurs at a frequency which is dictated by the random sample command circuit 108. At the same time, the reset operation, normally controlled by comparators 44 and 48, is supended from such control and placed in the control of the random sample command 108. Thus, the information which is transferred from the tracking integrators 10 and 12 to the summing integrator 88 corresponds with the positive and negative peak information which occurred any time between outputs from the random sample command circuit 108. In this manner, the frequency range of the voltmeter shown herein is greatly extended without substantial loss of accuracy or information content.

Although the specific nature of the circuit components shown in FIGURE 1 are believed to be obvious to those skilled in the art from the description of the functions thereof, a brief description of certain of the elements will be given. The integrators may take the form of conventional operational amplifiers employing capacitive feedback to provide an output equal to the time integral of the sum of the input voltages. The comparators 42, 44, 46 and 48 are high gain non-linear amplifiers which provide positive outputs only when the sum of the input voltages is greater than zero. The gate circuits are electronic relay devices which function to open or close a circuit between input and output points upon application of a control voltage thereto.

It is contemplated that various modifications and additions may be made to the specific circuit illustrating the invention as described above, and thus this illustration is not to be construed in a limiting sense. For a definition of the invention, reference should be had to the appended claims.

What is claimed is:

1. Apparatus for producing an output related in character to the maximum amplitude excursion of a time-varying signal quantity comprising first input means responsive to the positive going portion of the signal quantity to produce a first correspondingly increasing voltage, storage means, first transfer means connected to receive the signal quantity and responsive to a first predetermined increment of negative going portions thereof to transfer the first voltage to the storage means, second input means responsive to the negative going portion of the signal quantity to produce a second correspondingly increasing voltage, summing means having two inputs and effective to produce an output related to the sum of voltages applied to the inputs, and second transfer means connected to receive the signal quantity and responsive to a first predetermined increment of positive going portions thereof to transfer the first voltage from the storage means to one input of the summing means and to transfer the second voltage from the second input means to another input of the summing means.

2. Apparatus for producing an output related to the peak-to-peak amplitude of a time varying signal quantity comprising first tracking means connected to receive the input signal quantity and responsive to a positive going portion thereof to produce a first output signal which increases in amplitude corresponding to the amplitude of the input signal quantity, storage means, first transfer means connected to receive the input signal quantity and responsive to a first predetermined increment of negative going portions thereof to transfer the first output signal to the storage means, second tracking means connected to receive the input signal quantity and responsive to a negative going portion thereof to produce a second output signal which increases in amplitude according to the amplitude of the input signal quantity, summing means having two inputs and adapted to produce an output related to the sum of signals applied to the two inputs, and second transfer means connected to receive the input signal quantity and responsive to a first predetermined increment of the positive going portion thereof to transfer the first and second output signals to respective inputs of the summing means.

3. Apparatus for measuring the peak-to-peak amplitude of a time-varying input signal waveform comprising first means actuable to produce a first signal quantity of increasing amplitude, first comparator means for producing an output only when the amplitude of the signal applied to a first input thereof exceeds the amplitude of a signal applied to a second input thereof, the input signal waveform being connected to the first input of the first comparator means and the output of said first means being connected to the second input thereof, the output of the first comparator means being operatively connected to said first means to actuate the same whereby the first signal quantity increases in amplitude according to the increases in amplitude to the input signal waveform, storage means, first transfer means connected to receive the input signal waveform and responsive to a predetermined first increment of a negative going portion thereof to transfer the first signal quantity to the storage means, second means actuable to produce a second signal quantity of increasing amplitude, second comparator means for producing an output only when the amplitude of the signal applied to a first input thereof exceeds the amplitude of a signal applied to a second input thereof, the input signal waveform being connected to the first input of the second comparator and the output of the second means being connected to the second input thereof, the output of the second comparator means being operatively connected to said second means to actuate the same whereby the second signal quantity increases in amplitude according to the negative increases in the input signal waveform, summing means having two inputs and adapted to produce an output related to the sum of signal quantities applied to said input, and second transfer means connected to receive the input signal waveform and responsive to a predetermined first increment of the positive going portions thereof to transfer the first and second signal quantities to respective inputs of the summing means.

4. Apparatus for measuring the peak-to-peak amplitude of a time-varying input signal quantity comprising first tracking means connected to receive the input signal quantity and responsive to the positive going portion thereof to produce a first output signal which increases in amplitude corresponding to the amplitude of the input signal quantity, second tracking means connected to receive the input signal quantity and responsive to the negative going portions thereof to produce a second output signal which increases in amplitude according to the amplitude of the input signal quantity, summing means having two inputs and adapted to produce an output corresponding to the sum of the signal quantities applied to the said input, transfer means operable upon command to transfer the first and second output signals to respective inputs of the summing means, and means for producing periodic command signals, said last means being operatively connected to the transfer means.

5. Apparatus for measuring the peak-to-peak amplitude of a time-varying signal waveform comprising first and second means actuable to produce first and second signal quantities, respectively, of increasing amplitude, first comparator means for producing an output only when the amplitude of the signal applied to a first input positively exceeds the amplitude of a signal applied to a second input thereof, the input signal waveform being connected to the first input of the first comparator means and the output of said first means being connected to the second input thereof, the output of the first comparator means being operatively connected to said first means to actuate the same whereby the first signal quantity increases in amplitude according to the positive going portions of the signal waveform, second comparator means for producing an output only when the signal applied to a first input thereof negatively exceeds the amplitude of a signal applied to the second input thereof, the input signal waveform being connected to the first input and the output of the second means being connected to the second input thereof, the output of the second comparator means being operatively connected to said second means to actuate the same whereby the second signal quantity increases in amplitude according to the negative increases in the input signal waveform, summing means having two inputs and adapted to produce an output corresponding to the sum of signals applied to said inputs, transfer means connected to the first and second means and operable upon command to transfer the first and second signal quantities to respective inputs of the summing means, and command means for producing periodic command signals, said command means being operatively connected to said transfer means.

6. Apparatus for producing an output related in character to the maximum amplitude excursion of a time-varying signal quantity comprising first input means connected to receive the input signal quantity and responsive to the positive going portions thereof to produce first correspondingly increasing voltages, second input means connected to receive the signal quantity in response to the negative going portions thereof to produce second correspondingly increasing voltages, summing means having two inputs and adapted to produce an output related to the sum of voltages applied to the inputs thereof, transfer means connected to the first and second input means and operable upon command to transfer the first and second voltages to respective inputs of the summing means, and means for producing periodic command signals, said last means being operatively connected to said transfer means to operate the same.

7. Apparatus for computing the peak-to-peak voltage of a time-varying input voltage comprising first integrator means, first gate means responsive to a command signal to apply a constant voltage of a first polarity to the first integrator means, first comparator means connected to receive the input voltage and the output voltage of the first integrator means and operative to produce a command signal whenever the first input voltage is more positive than said output voltage, the output of the first comparator means being connected to control the first gate means whereby the output of the first integrator means follows the positive going portion of the input voltage, second integrator means, second gate means responsive to a command signal to apply a constant voltage of a second polarity to the second integrator means, second comparator means connected to receive the input voltage and the output of the second integrator means and operative to produce a command signal whenever the input is more negative than said output voltage, the output of the second comparator means being connected to control the second gate means whereby the output of the second integrator means follows the negative going portion of the input voltages, summing means having two inputs and adapted to produce an output related to the sum of the voltages applied to said inputs, and transfer means for periodically transferring the output voltages of the first and second integrator means to respective inputs of the summing means.

8. Apparatus for computing the peak-to-peak voltage of a time-varying input voltage comprising first integrator means, first gate means responsive to a command signal to apply a constant voltage of a first polarity to the first integrator means, first comparator means connected to receive the input voltage and the output voltage of the first integrator means and operative to produce a command signal whenever the first input voltage is more positive than said output voltage, the output of the first comparator means being connected to control the first gate means whereby the output of the first integrator means follows the positive going portion of the input voltage, second integrator means, second gate means responsive to a command signal to apply a constant voltage of a second polarity to the second integrator means, second comparator means connected to receive the input voltage and the output of the second integrator means and operative to produce a command signal whenever the input is more negative than said output voltage, the output of the second comparator means being connected to control the second gate means whereby the output of the second integrator means follows the negative going portion of the input voltages, summing means having two inputs and adapted to produce an output related to the sum of the voltages applied to said inputs, third and fourth gate means responsive to command signals to transfer the output voltages from the first and second integrator means, respectively, to individual inputs of the summing means, and means connected to the third and fourth gate means for applying periodic command signals thereto.

9. Apparatus as defined in claim 8 including means for resetting the first and second integrator means upon occurrence of the command signals to the third and fourth gate means.

10. Apparatus for computing the peak-to-peak voltage of a time-varying input voltage comprising first integrator means, first gate means responsive to a command signal to apply a constant voltage of a first polarity to the first integrator means, first comparator means connected to receive the input voltage and the output voltage of the first integrator means and operative to produce a command signal whenever the first input voltage is more positive than said output voltage, the output of the first comparator means being connected to control the first gate means whereby the output of the first integrator means follows the positive going portion of the input voltage, second integrator means, second gate means responsive to a command signal to apply a constant voltage of a second polarity to the second integrator means, second comparator means connected to receive the input voltage and the output of the second integrator means and operative to produce a command signal whenever the input is more negative than said output voltage, the output of the second comparator means being connected to control the second gate means whereby the output of the second integrator means follows the negative going portion of the input voltages, storage means, third gate means actuable upon command to transfer the output of the first integrator means to the storage means, summing means having two inputs and adapted to produce an output related to the sum of the voltages applied to the inputs, fourth gate means actuable upon command to transfer the output of the second integrator means to one input of the summing means, fifth gate means actuable upon command to transfer the output of the storage means to another input of the summing means, means responsive to a first predetermined increment of a negative going portion of the input voltage to actuate the third gate means, means responsive to a first predetermined increment of a positive going portion of the input voltage to actuate the fourth and fifth gate means, and means for resetting the first and second integrator means upon transfer of signal therefrom.

References Cited
UNITED STATES PATENTS

| | | | |
|---|---|---|---|
| 2,979,663 | 4/1961 | Gill et al. | 328—150 |
| 3,295,060 | 12/1966 | Stern | 307—88.5 |
| 3,331,026 | 7/1967 | Parker | 328—150 |

JOHN S. HEYMAN, *Primary Examiner.*